United States Patent [19]
Witkowski

[11] 3,717,922
[45] Feb. 27, 1973

[54] METHOD OF MAKING SKIN REINFORCED PALLET

[76] Inventor: Henry J. Witkowski, 5625 East Lake Road, Erie, Pa. 16508

[22] Filed: June 8, 1971

[21] Appl. No.: 151,129

Related U.S. Application Data

[63] Continuation of Ser. No. 814,724, April 9, 1969, abandoned.

[52] U.S. Cl. ..................29/421, 29/455, 29/460, 108/58, 264/45
[51] Int. Cl. ..............................................B23p 17/00
[58] Field of Search ..........29/421, 455, 460; 264/45; 108/51-58

[56] References Cited

UNITED STATES PATENTS

| | | | |
|---|---|---|---|
| 3,140,672 | 7/1964 | De Luca | 108/53 |
| 3,166,831 | 1/1965 | Keith | 29/421 X |
| 3,199,469 | 8/1965 | Sullivan | 108/53 |
| 3,233,564 | 2/1966 | Sullivan | 108/53 |
| 3,277,849 | 10/1966 | Talbot | 108/58 |
| 3,435,470 | 4/1969 | Krenzler | 156/79 X |
| 3,470,058 | 9/1969 | Heffner | 264/45 X |
| 3,472,728 | 10/1969 | Hitch | 264/45 X |
| 3,605,651 | 9/1971 | Stewart | 108/53 X |

Primary Examiner—Richard J. Herbst
Assistant Examiner—Victor A. DiPalma
Attorney—Charles L. Lovercheck

[57] ABSTRACT

The disclosure describes a preferred form of a method of making a pallet by forming legs on a sheet of material and attaching a second sheet to the marginal edges of the first sheet and filling the space between the sheets and the legs with a foamable plastic material such as polyurethane, or the like. The sheets may be any vacuum formable material such as thermoformable plastic. They could also be other materials that may be formed or molded into sheets with legs, such as cardboard, metal, wood, or other suitable structural materials.

1 Claim, 4 Drawing Figures

PATENTED FEB 27 1973  3,717,922

Inventor
HENRY J. WITKOWSKI
By Charles L. Lovercheck
Attorney

METHOD OF MAKING SKIN REINFORCED PALLET

This application is a continuation of Ser. No. 814,724 filed Apr. 9, 1969, now abandoned.

STATEMENT OF INVENTION

This invention relates to pallets and more particularly to pallets made from plastic materials.

EXPLANATION OF INVENTION

Pallets are structures used for support and transport of articles of varying sizes and weights. Typically, pallets are made of wood. This has several disadvantages, however. Continuous use results in a substantial amount of wear and tear; the utility of a wooden pallet is rapidly diminished. Furthermore, repair and maintenance costs are prohibitively high, often being more than the replacement cost. Replacement is often necessary.

Another type of pallets are made of plastic; an example of this is shown in U.S. Pat. No. 3,140,672 and U.S. Pat. No. 3,277,849.

U.S. Pat. No. 3,140,672 shows a pallet made of a molded plastic structure with legs molded on the bottom and a sheet supported on the top. The sheets are molded from fiberglass material and the sheets themselves are utilized to carry the weight of material to be transported.

Applicant has discovered that by thermoforming a sheet with legs on it and attaching a flat sheet to this first mentioned sheet and filling the space between these two sheets with a foamable plastic material that a more economical, stronger pallet can be made and, furthermore, a much thinner and a more economical material can be used for the sheets.

OBJECTS OF THE INVENTION

It is, accordingly, an object of the invention to provide a pallet that lends itself to easy manufacture.

Another object of the invention is to provide a pallet that is light in weight, simple in construction, economical to manufacture, and simple and efficient to use.

DETAILED DESCRIPTION OF THE DRAWINGS

Figure 1:
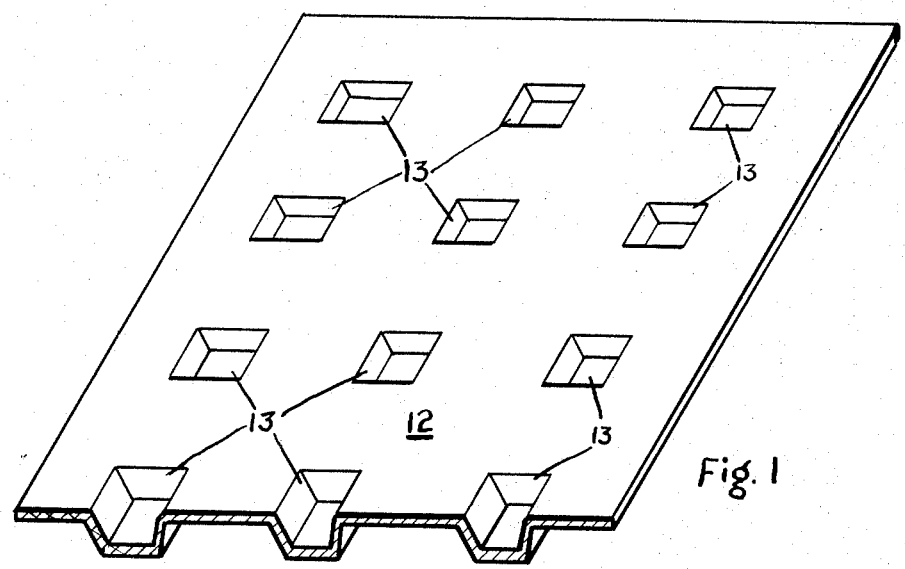
FIG. 1 is an isometric view of the bottom sheet of a pallet according to the invention.
Figure 2:
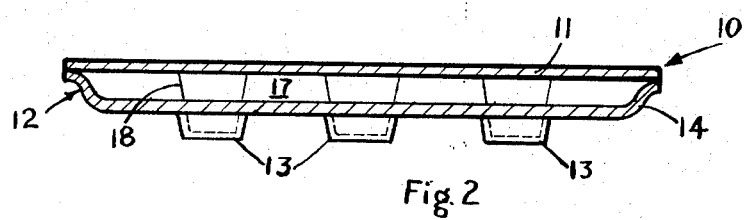
FIG. 2 is a longitudinal cross sectional view of the pallet.

Now with more particular reference to the drawings, the drawings show a pallet 10 with an upper flat sheet 11 dished downward around the edges and attached around its marginal edges 14 to a lower sheet 12 which has the legs 13 formed on it. The two sheets may be fastened together along their marginal edges by stapling, gluing, cementing, or other suitable fastening means. The legs are supported in spaced rows so that the pallet is actually a double-entry pallet; that is, the fork tines of a lifting truck can enter the spaces between the legs of the pallet from either of four directions. The legs 18 are concentric with legs 13. Thus, foam material is saved since the top legs in effect core out the bottom.

The foam material 17 between the sheets may be foamed in place according to well known practices used with polyurethane or polystyrene or any other suitable foaming materials.

The one-piece molded construction of the bottom sheet makes it especially adaptable to manufacture by a suitable vacuum-forming process or other thermoforming process. However, it is obvious that the bottom sheet with the legs could be made by a molding process, such as is commonly used in molding fiberglass materials over a form. The top and bottom sheet can also be made of extremely low cost materials, such as cardboard. The foam material gives the pallet considerable strength.

There are many modifications that can be made on the disclosed structure, for example, ribs could be molded on the bottom sheet, such as are molded on the bottom sheet in U.S. Pat. No. 3,140,672. Extra durability of the flat top sheet can be obtained by substituting a hardboard, metal or a thin plywood sheet or a sheet of urethane material which is highly resistant to abrasions. A piece of molded fiberglass material could be substituted for the top sheet to give additional wearing qualities. However, it is contemplated in the preferred embodiment that the molded material be thermoformed from styrene, A.B.S., acrylic, polyethylene, polypropylene or vinyl sheet of material that is in the order of 0.020 or more inches in thickness.

Figure 3:
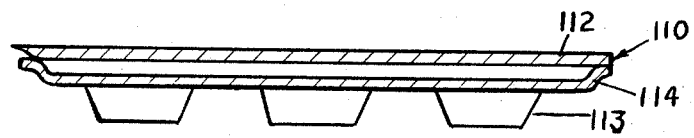
FIG. 3 is a view similar to FIG. 1 of another embodiment of the invention.
Figure 4:
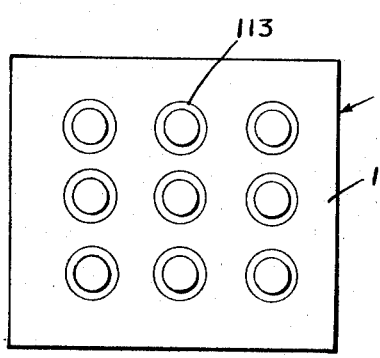
FIG. 4 is a bottom view of the embodiment of FIG. 3.

The legs could be frusto-conical in shape to avoid the corner as shown in FIGS. 3 and 4. These legs 113 are formed on the sheet 114 which may be of thermoformable material. Top sheet 112 is shown made of plywood for strength.

The embodiments of the invention in which an exclusive property or privilege is claimed are defined as follows:

1. A method of forming a pallet comprising vacuum forming hollow legs on a sheet of relatively thin material to form legs thereon,
   attaching a second sheet similar to said first sheet of material having legs formed thereon to said first sheet around the marginal edges of said first sheet with a space between said sheets,
   said legs of said first sheet extending outward from said first sheet into said legs of said second sheet, and foaming a foamable material taken from the group of urethane foam, polyethylene, vinyl, polystyrene and polyurethane, in the space between said sheets and into the cavities formed between said legs whereby a rigid pallet having legs protruding from one side is formed.

* * * * *